United States Patent
Garay Serrano et al.

(10) Patent No.: US 9,776,665 B2
(45) Date of Patent: Oct. 3, 2017

(54) LOAD PATH CONTROL MECHANISM

(71) Applicant: Ford Global Technologies, LLC, Dearborn, MI (US)

(72) Inventors: Antonio Dario Garay Serrano, Toluca (MX); Zhibing Deng, Northville, MI (US); Jamil M. Alwan, Ann Arbor, MI (US); Mark Wlotkowski, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 12 days.

(21) Appl. No.: 14/922,277

(22) Filed: Oct. 26, 2015

(65) Prior Publication Data

US 2017/0113728 A1    Apr. 27, 2017

(51) Int. Cl.
| | |
|---|---|
| *B62D 21/15* | (2006.01) |
| *B62D 24/00* | (2006.01) |
| *B62D 27/02* | (2006.01) |
| *B62D 21/02* | (2006.01) |

(52) U.S. Cl.
CPC .......... *B62D 21/157* (2013.01); *B62D 21/02* (2013.01); *B62D 24/00* (2013.01); *B62D 27/02* (2013.01); *B62D 27/023* (2013.01)

(58) Field of Classification Search
CPC .... B62D 21/157; B62D 27/023; B62D 24/00; B62D 27/02
See application file for complete search history.

(56) References Cited

U.S. PATENT DOCUMENTS

| | | | | |
|---|---|---|---|---|
| 5,700,049 A | * | 12/1997 | Shibata | B62D 24/02 296/187.09 |
| 5,966,813 A | * | 10/1999 | Durand | B23K 13/025 219/611 |
| 6,758,516 B1 | * | 7/2004 | Abramczyk | B62D 21/157 296/187.12 |
| 6,786,534 B1 | * | 9/2004 | Peng | B60J 5/042 296/187.08 |
| 6,857,692 B2 | | 2/2005 | Cardimen et al. | |

(Continued)

FOREIGN PATENT DOCUMENTS

| | | |
|---|---|---|
| EP | 1762465 A1 | 3/2007 |
| WO | WO 9902781 | 1/1999 |

OTHER PUBLICATIONS

UK Search Report dated May 3, 2017 (3 pages).

*Primary Examiner* — Darlene P Condra
(74) *Attorney, Agent, or Firm* — Frank A. MacKenzie; Bejin Bieneman PLC

(57) ABSTRACT

A load path control mechanism is fixed to a frame rail and includes a coupling bracket, a spacer bracket and a frame crossmember. The frame rail defines an inner chamber therein. The frame crossmember is fixed to the frame rail. The coupling bracket is disposed in the inner chamber and is fixed to the frame rail, paralleling the frame crossmember. The coupling bracket has a first projected area on a plane normal to a lateral axis. The spacer bracket, disposed on an outboard side of the frame rail, has a second projected area on a plane normal to the lateral axis. The projected areas at least partially overlap. The spacer bracket has a deformation mode responsive to a first load under which the space bracket deflects against the first side of the frame rail which deflects against the coupling bracket.

20 Claims, 11 Drawing Sheets

(56) References Cited

U.S. PATENT DOCUMENTS

| | | |
|---|---|---|
| 6,932,495 B2 * | 8/2005 | Sloan ................. F21V 21/0808 |
| | | 362/231 |
| 7,216,924 B2 | 5/2007 | Li et al. |
| 7,631,926 B2 | 12/2009 | Fonseka et al. |
| 8,007,032 B1 | 8/2011 | Craig et al. |
| 8,272,679 B2 | 9/2012 | Deng et al. |
| 8,602,454 B1 | 12/2013 | Baccouche et al. |
| 8,608,230 B2 * | 12/2013 | Young ..................... B60K 1/04 |
| | | 296/187.02 |
| 2005/0194818 A1 | 9/2005 | Odaka et al. |
| 2006/0087107 A1 * | 4/2006 | Li ....................... B62D 25/025 |
| | | 280/784 |
| 2007/0284914 A1 | 12/2007 | Schiebel et al. |
| 2009/0085375 A1 | 4/2009 | Fonseka et al. |
| 2015/0042125 A1 | 2/2015 | Bruggemann et al. |

* cited by examiner

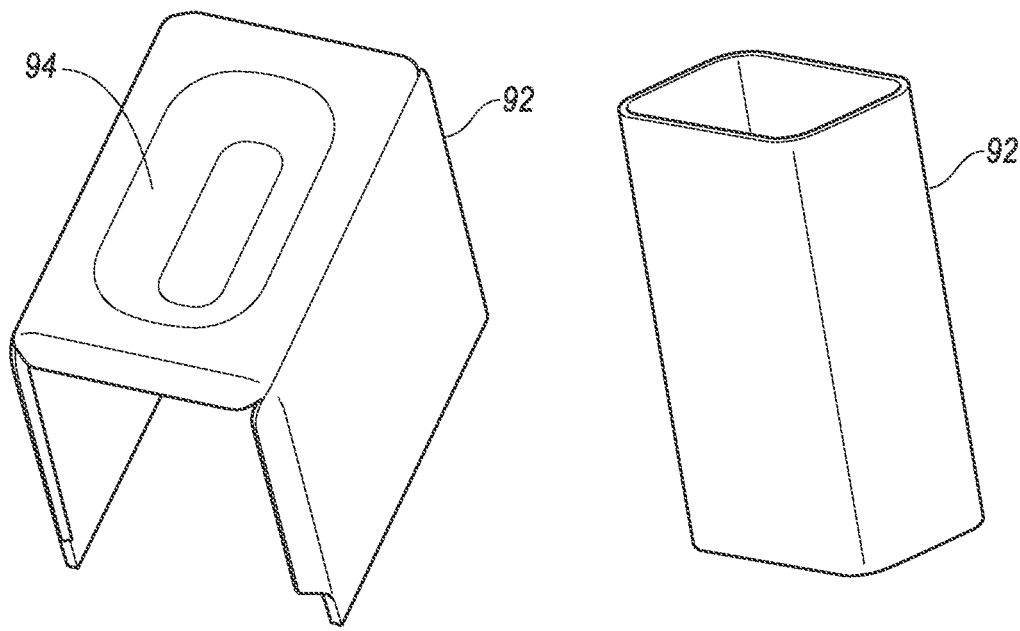
FIG. 14   FIG. 15
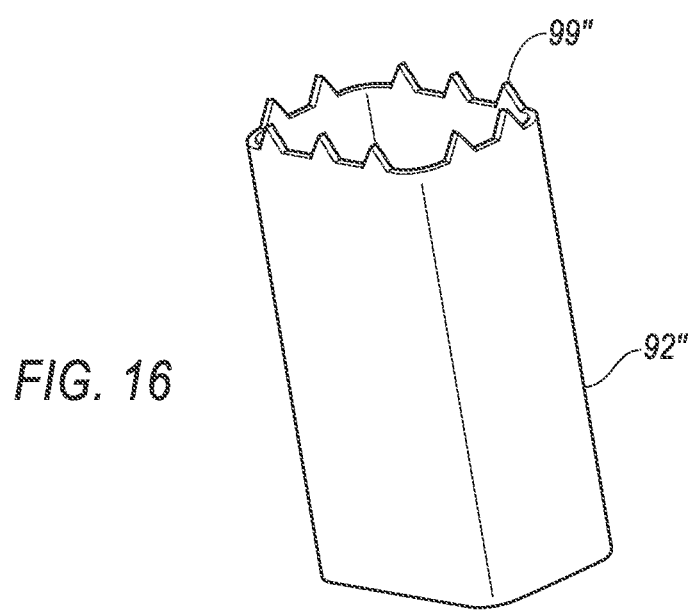
FIG. 16

LOAD PATH CONTROL MECHANISM

BACKGROUND

For typical body-on-frame vehicles, the body is wider than the frame. In a side or lateral impact, the body sustains the initial impact and associated deformation. The body's floor crossmembers are the primary load paths for side impact protection in a first phase of the impact. With sufficient body deformation, frame structures are engaged and provide additional lateral load transfer. Due to a significant gap between the side of the body and the frame rails as found in typical body-on-frame vehicles, the floor crossmembers sustain the initial impact force alone. This requires significant body structure to achieve an appropriate structural strength to reduce undesired seat position shifts due to floor deformation.

The frame structure at present does not sustain any significant impact loading until the deformed body engages the proximate frame rail. No significant lateral load is transferred into or across the frame via the frame crossmembers until the deforming body engages the proximate frame rail.

While the body-to-frame mounts do transfer certain loads between the body and the frame, the intended and primary load transfer direction sustained by the mounts is in the vertical direction. Body mounts are not designed to transfer lateral impact loads from the body to the frame and enable a limited amount of lateral side to side movement of the body relative to the frame. Presently, brackets may be placed directly between the rocker panel and the side rail to transfer impact loading to the frame to achieve less body deflection, but these communicate the impact force solely from the rocker to the proximate frame rail, and allow for undesired or excessive deformation of the proximate frame rail.

BRIEF DESCRIPTION OF THE DRAWINGS

FIG. 14 is a perspective view of the coupling bracket of FIGS. 6 and 7.

FIG. 15 is a perspective view of the coupling bracket of FIGS. 8, 9 and 10.

FIG. 16 is a perspective view of an alternative embodiment of the coupling bracket of FIGS. 8, 9 and 10.

DETAILED DESCRIPTION

Relative orientations and directions (fore, aft, left, right, up, down) are set forth in this description not as limitations, but for the convenience of the reader in picturing at least one embodiment of the structures described. Such relative orientations are taken from the driver's perspective.

Figure 1:
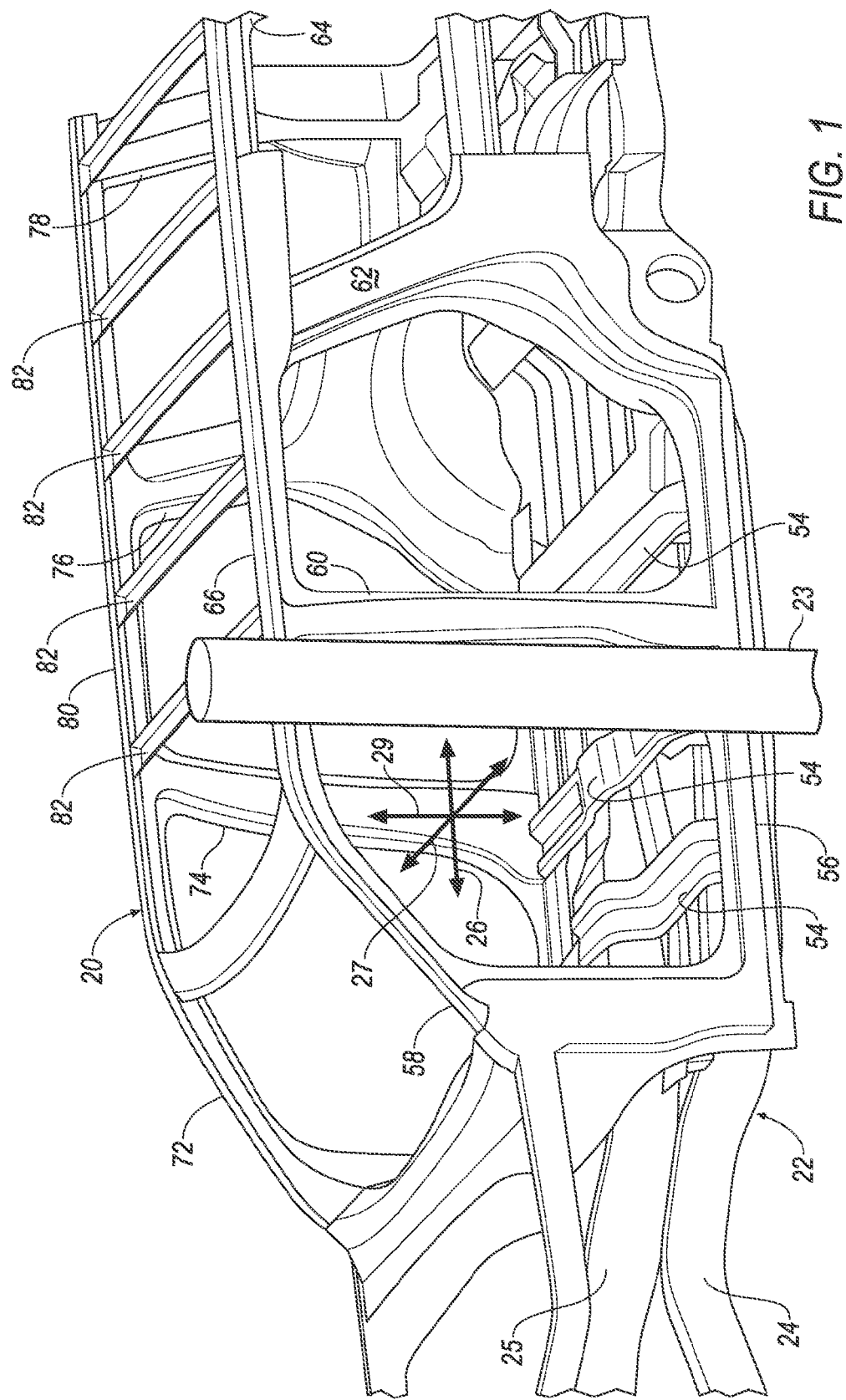
FIG. 1 is a perspective view of an example of a vehicle body disposed over a separate vehicle frame.

A vehicle body 20 shown in body-in-white form, highlighting the body's structural elements, is disposed over a vehicle frame 22 in FIG. 1. A test impact pole 23 is shown in shadow on the left side of the vehicle.

Figure 4:
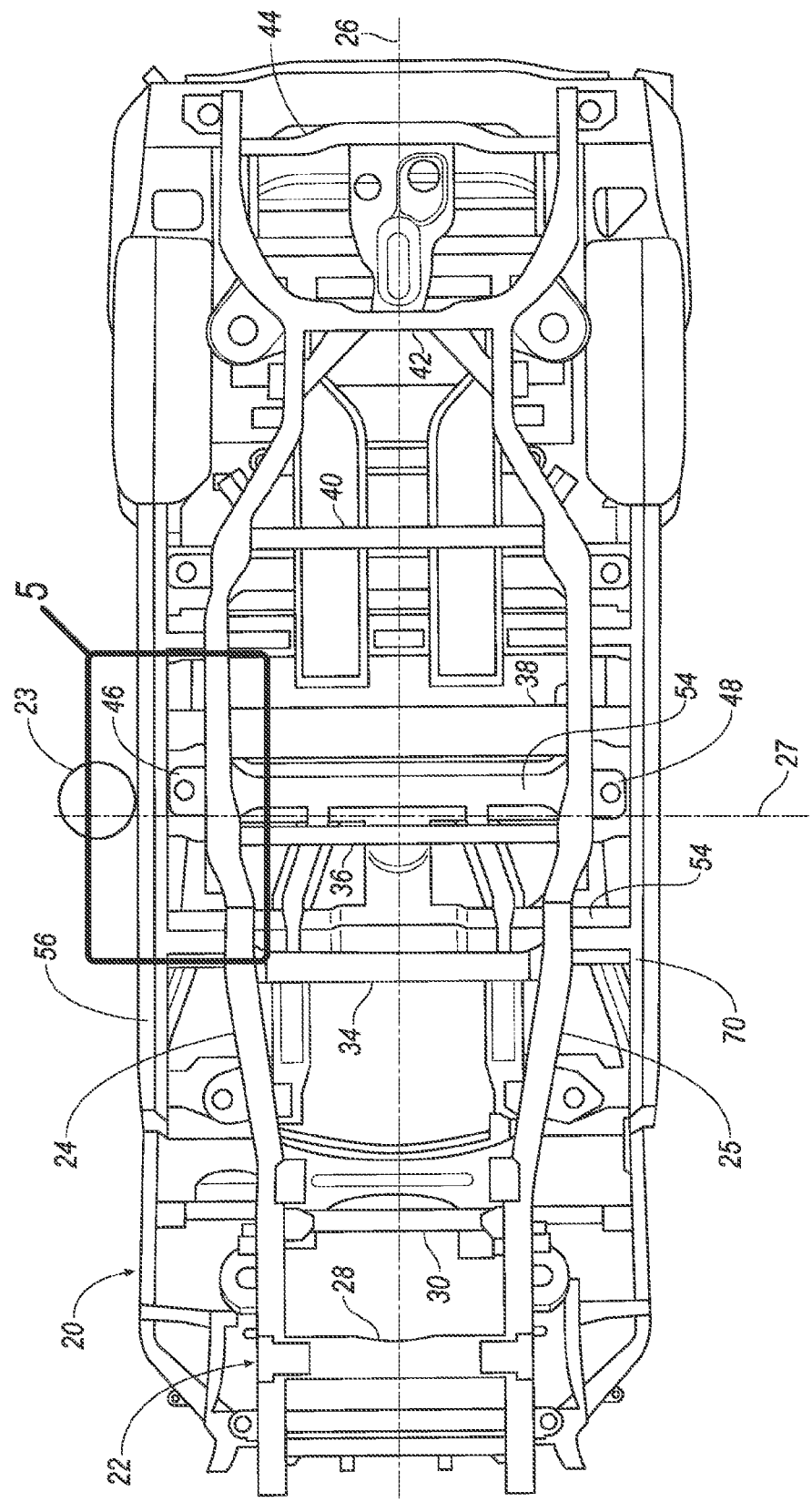
FIG. 4 is a bottom view of the body and the frame of FIG. 1.

Frame 20, best shown in FIG. 4, includes both a left hand frame rail 24 and a right hand frame rail 25. The frame rails are substantially mirror images of each other. Some limited side-to-side variation exists as motor vehicles are not perfectly symmetrical. Both frame rails are substantially parallel to a common fore-aft axis 26. Each of the rails 24, 25 and the crossmembers is characterized as being substantially parallel to its respective axis because the rails and crossmembers are not perfectly straight. The rails have bends accommodating the mounting of components supporting the frame, and components supported by the frame.

Figure 5:
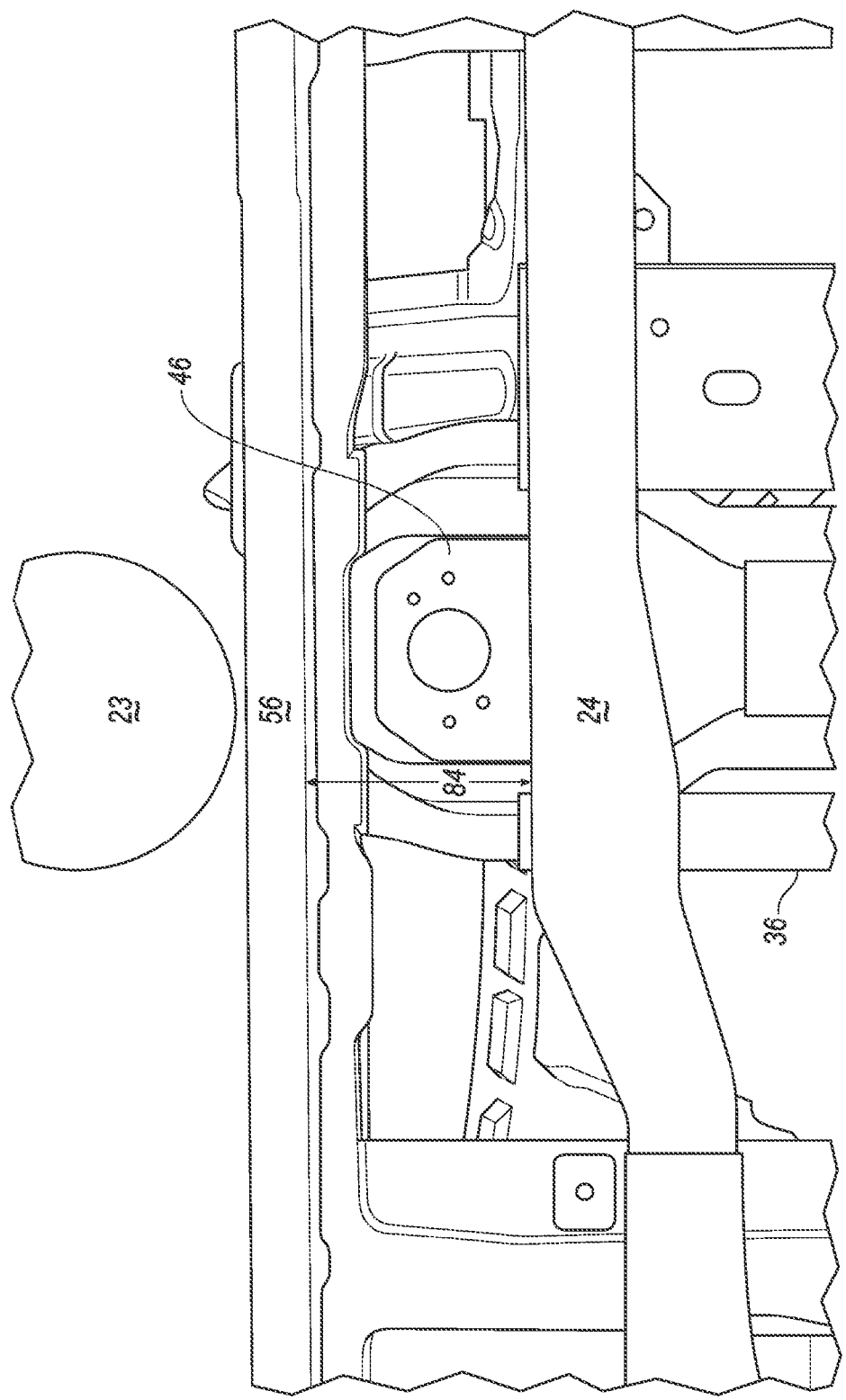
FIG. 5 is an enlarged view of the portion of the body and the frame inside loop 5 of FIG. 4.

A plurality of frame crossmembers 28, 30, 34, 36, 38, 40, 42, and 44 are disposed between and are rigidly connected to the frame rails 24 and 25. Frame crossmembers are substantially parallel to a lateral axis 27. A vertical axis 29 is perpendicular to both the fore-aft axis 26 and the lateral axis. For optimal benefit, a selected crossmember should pass directly under a seat location. The seat location has a predetermined position along the fore-aft axis 26. The exemplary crossmember 36 passes directly under the front seats. As best seen in FIG. 5, the crossmember 36 passes completely through frame rail 24. An outboard end of crossmember 36 extends slightly beyond an outboard side of frame rail 24. Crossmember 36 is welded to the rail 24 on both an inboard side of rail 24 and an outboard side of rail 24.

Figure 7:
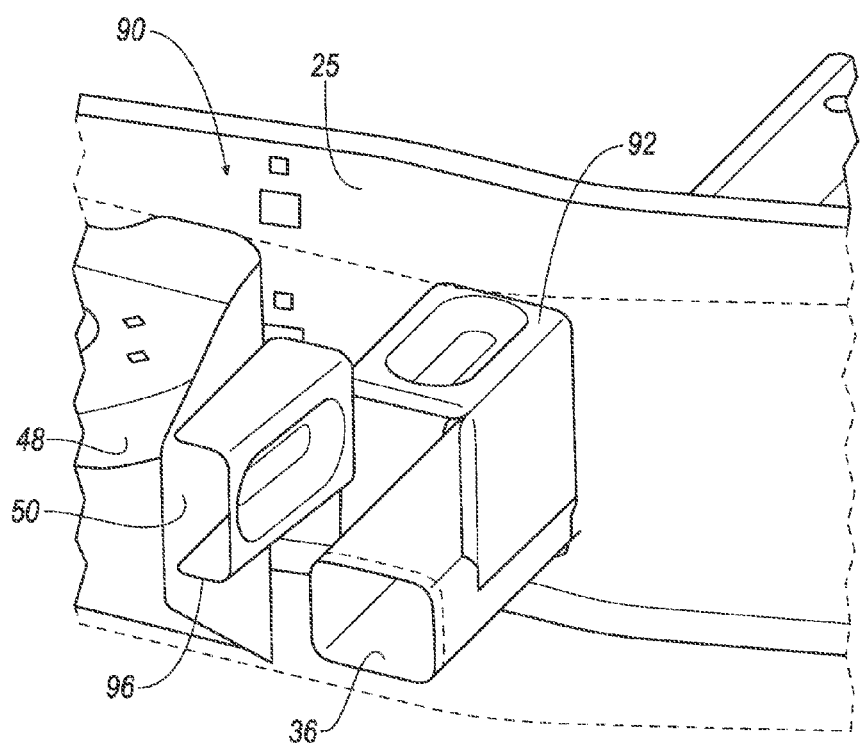
FIG. 7 is a perspective view of the first embodiment of the load path control mechanism on the right hand side, facing inboard and backwards with portions of a frame rail shown as transparent to facilitate the view of the illustrated structure.

The load path control mechanisms 90 can be adapted to accommodate the location of other mountings on the frame such as body mounts 46, 48. As shown in FIG. 4, a plurality of body mounts 46, 48 are fixed to an outboard side of the frame rails 24, 25. The body mounts include a left hand body mount 46 in a first position on the left hand frame rail 24, and a right hand body mount 48 in a second position on the right hand frame rail 26. The body mounts 46 and 48 incorporate support flanges. A support flange 50 for the right hand body mount is best shown in FIG. 7. The body mounts 46, 48 can be placed on the respective inboard sides of the frame rails 24, 26, or mounted directly to the frame rails 24, 26.

As also shown in FIG. 4, the body 20 includes an underbody or floor which in turn includes floor crossmembers 54 and a floor panel (not shown).

The overall vehicle body construction suited for employing the illustrated embodiments is best seen in FIG. 1. A left hand side structure of the body includes a left hand rocker 56 beneath the left hand door openings. A left hand A pillar 58, B pillar 60, C pillar 62 and D pillar 64 (partially shown) extend upwards to a left hand roof side rail 66. A right hand side structure of the body includes a right hand rocker 70 beneath the right hand door openings. A right hand A pillar 72, B pillar 74, C pillar 76 and D pillar 78 (partially shown) extend upwards to a right hand roof side rail 80.

Roof crossmembers 82 connect the roof side rails 66 and 80. A roof panel (not shown) is disposed between roof side rails 66 and 80 over roof crossmembers 82.

Figure 2:
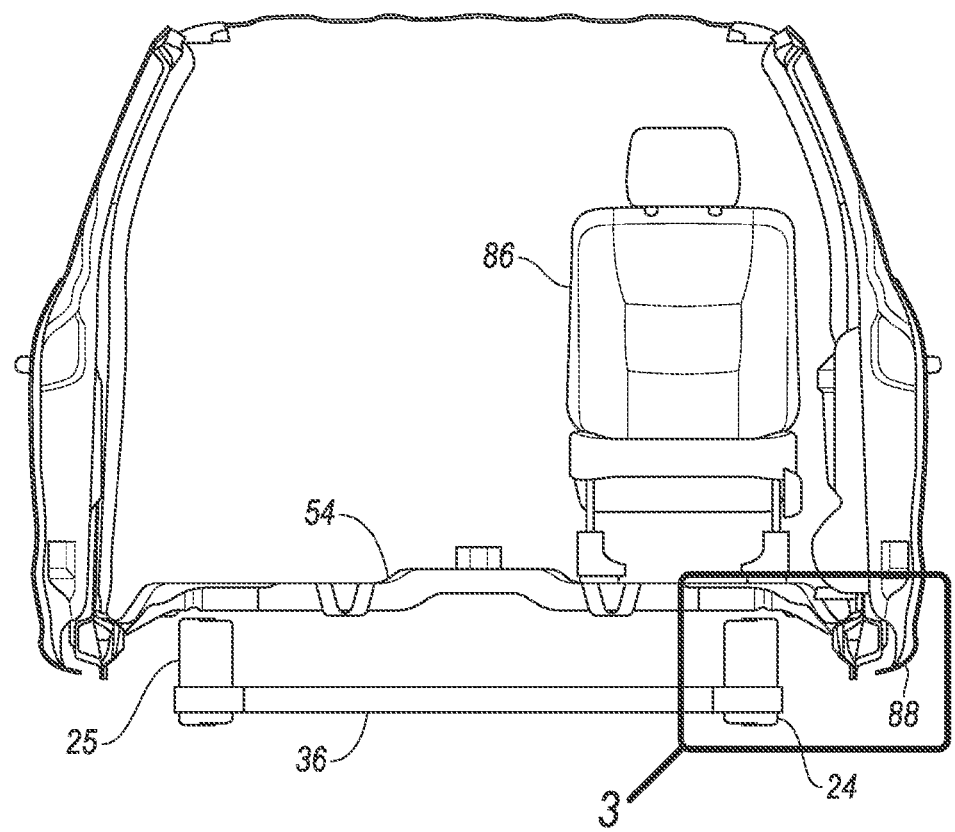
FIG. 2 is a sectional view of the body and the frame of FIG. 1 taken just forward of a front seat location and looking toward a rear of the vehicle and showing a seat in the front left seating position.
Figure 3:
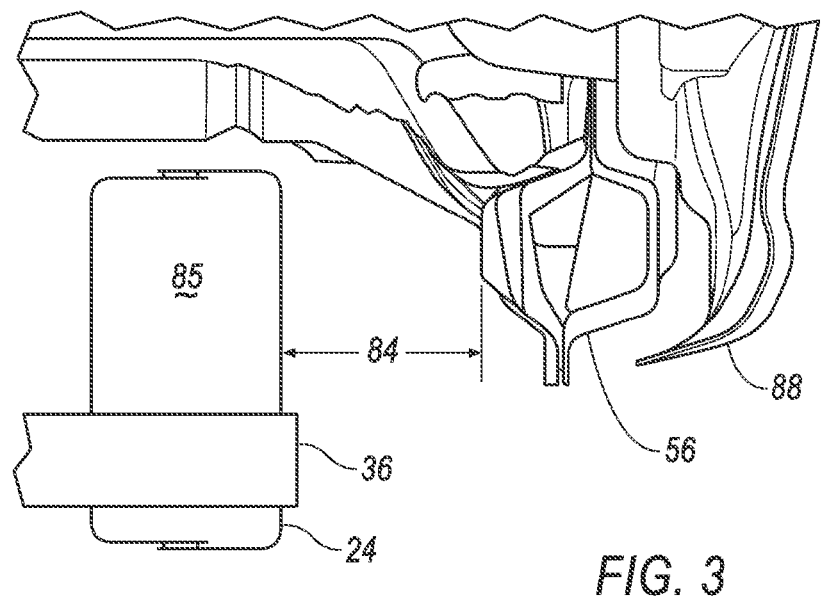
FIG. 3 is an enlarged view of the portion of the body and the frame inside loop 3 of FIG. 2.
Figure 19:
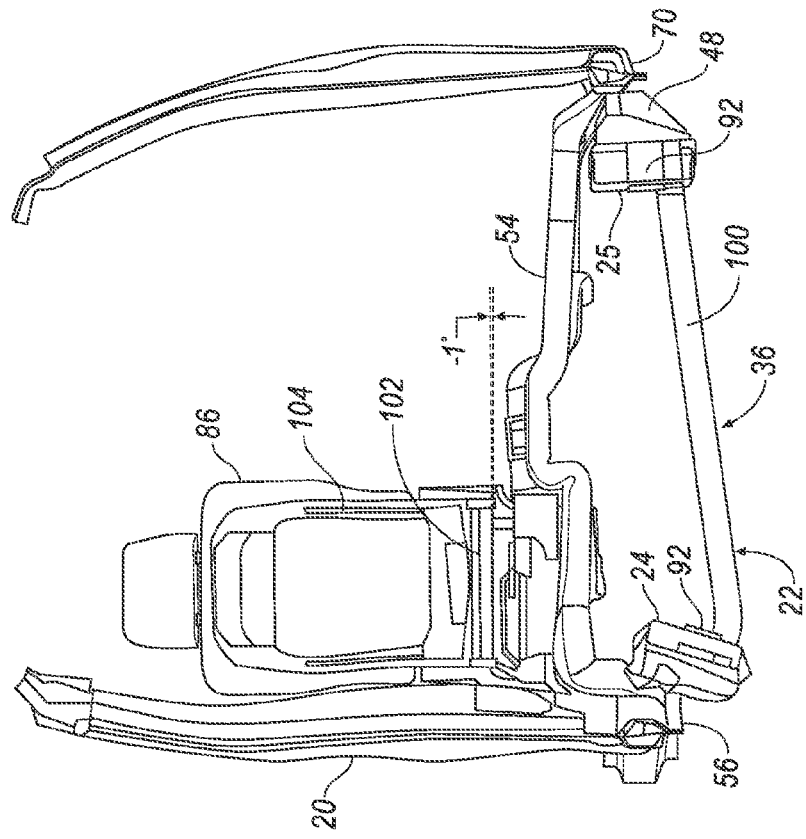
FIG. 19 is a sectional view of the body and the frame of FIG. 1 without the coupling bracket and the spacer bracket taken just rearward of the front seat location and looking toward a front of the vehicle and showing a seat in the front left seating position and with the body and frame deformed by a lateral impact.
Figure 20:
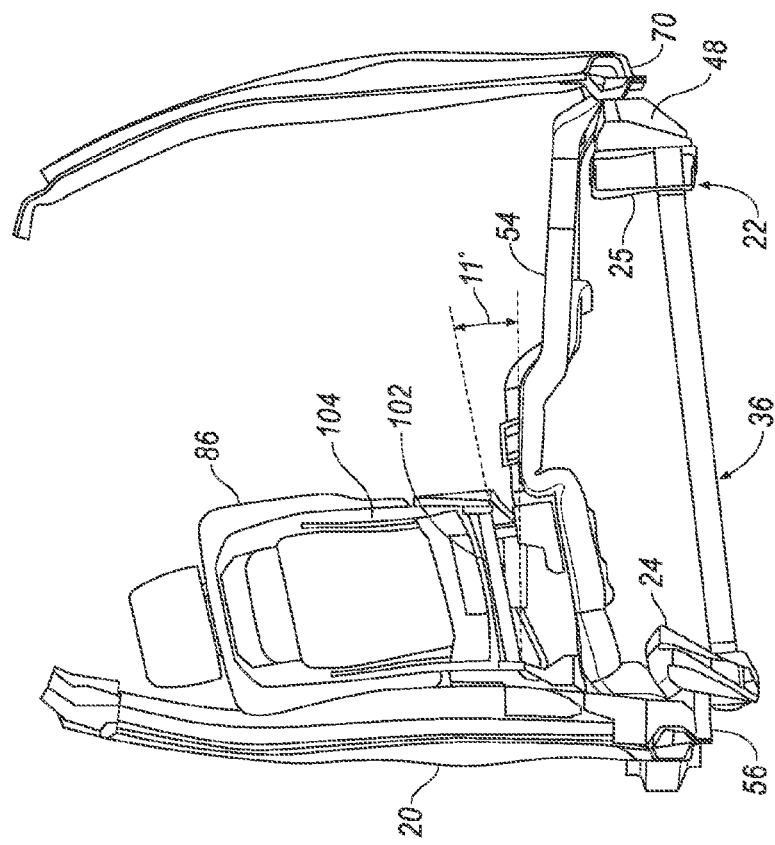
FIG. 20 is a sectional view of the body and frame of FIG. 1 incorporating the first embodiment of the load path control mechanism taken just rearward of the front seat location and looking toward a front of the vehicle and showing a seat in the front left seating position and with the body and frame deformed by a lateral impact.

As shown in FIG. 2, and more clearly in FIG. 3, there is a significant space or gap 84 within a range of approximately, depending on the precise location where the measurement is taken, 125 mm to 300 mm between the left hand frame rail 24 and the left hand rocker 56. A similar gap is found on the right hand side, as the structure in FIG. 3 is representative of both the left side and the right side. The left hand frame rail 24, at least for the portion illustrated, has a rectangular or box-shaped cross section defining an inner chamber 85. FIG. 2 also illustrates the position of a left hand seat 86 relative to both the rocker 56 and the frame rail 24. FIG. 2 shows the seat 86 mounted to the floor crossmember 54. FIGS. 19 and 20 show that deflection of the crossmember 54 affects the position of the seat within the vehicle due to impingement against pole 23. In FIG. 3, a door outer panel defines a body panel 88 shown outboard of the rocker 56.

Figure 6:
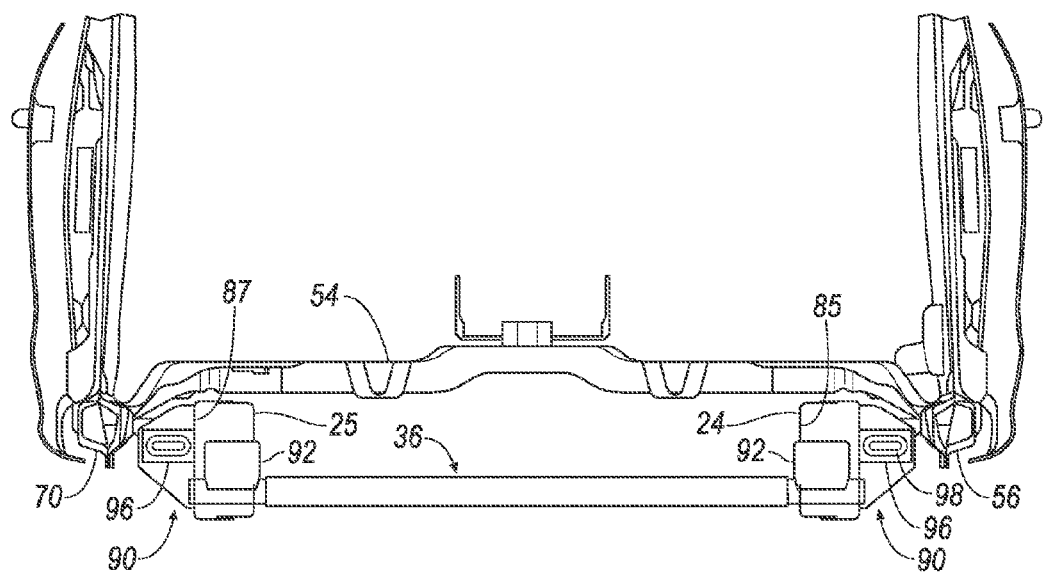
FIG. 6 is a sectional view of the body and frame of FIG. 1 in the same direction as FIG. 2 without the seat and incorporating a first embodiment of the load path control mechanism.

FIG. 6 and FIG. 7 show a first embodiment of a load path control mechanism 90. A coupling bracket 92 is disposed in the inner chamber 85 of the left hand frame rail 24 immediately above and in engagement with the crossmember 36. A spacer bracket 96 as illustrated is fixed both directly to the frame rail 24 on one end, and to the frame rail 24 through the body mount 46 on a separate side, and is disposed between the frame rail and the rocker. In the illustrated embodiment, the spacer bracket 96 is fixed to the body mount 46 and the frame rail 24 by welding. It is appreciated that other means of attaching the spacer bracket 96 to the frame rail 24 could be employed, or yet alternatively, certain of the pieces could be formed as integral units, such as spacer bracket 96 being formed as part of the body mount 46. The coupling bracket 92 and the spacer bracket 96 are shown in more detail in FIGS. 14 and 11 respectively. As illustrated in FIG. 7, the coupling bracket 92 and the spacer bracket 96 are respectively positioned so that there is overlap of respective projected areas thereof as defined by sections by planes normal to the lateral axis, especially sections closest to the outboard side of the associated frame rail, as projected laterally onto a plane normal to the lateral axis. Put another way, if the coupling bracket 92 could move laterally through the outboard side of the rail 24, it would overlap and either engage or receive or be received by the spacer bracket 96. While not necessarily coaxial, the brackets 92 and 96 are aligned with each other to provide such overlap.

As illustrated in FIG. 14, the first embodiment of the coupling bracket 92 is C-shaped with the open side of the C disposed toward the crossmember. The coupling bracket 92 has a stiffening bead 94 formed in an upper surface, on the side opposite the open side. The coupling bracket 92 is fixed by any appropriate means, including but not limited to welding, to an upper part of the crossmember 36 along the bracket's open side, defining a laterally-extending box shape therebetween. The coupling bracket 92 is similarly fixed to the inboard side of the frame rail 24 as illustrated in FIGS. 6 and 7. An inboard portion of the coupling bracket 92 passes through the inboard side of the frame rail 24, with an outboard end of the coupling bracket being disposed outside of the inboard side of the left hand frame rail 24. The outboard end of the coupling bracket is disposed inside the inner chamber 85. Both ends of the bracket 92 have inwardly-folded creased edges best seen in FIG. 14. A small portion of each creased edge is removed at the bottom of the bracket 92 to facilitate having the bracket 92 slip over the crossmember 36 prior to welding the bracket 92 to the crossmember 36. In the first embodiment, there is a small gap between the outboard end of the coupling bracket 92 and the outboard side of the frame rail 24. In the illustrated embodiment, the small gap has a target value of 19 mm, with the target value depending on the associated structural elements such as a thickness of the outboard side of frame rail 24.

Figure 11:
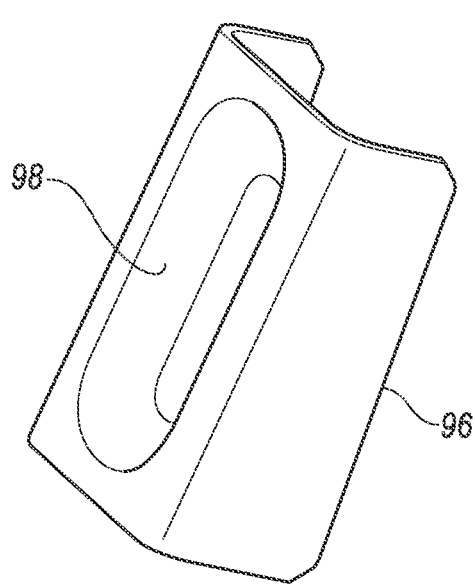
FIG. 11 is a perspective view of the example spacer bracket illustrated in FIGS. 6 and 7.

The spacer bracket 96 of FIG. 11 is C-shaped with the open side of the C disposed toward the flange 50 forming part of the body mount 48 on the right side of the frame in FIG. 7. The spacer bracket 96 has a stiffening bead 98 formed in a rear-ward facing surface, on the side opposite the body mount flange. The spacer bracket 96 is welded to the body mount flange 50 along the edges of the bracket's open side, defining a laterally-extending box shape there between. The spacer bracket 96 is tapered, with its width in the direction of the fore-aft axis 26 increasing along the lateral axis 27. The projected area of a cross section of spacer bracket 96 increases as the location of the section moves further inboard along axis 27. The tapered shape provides spacer bracket 96 with a stiffness that increases in the lateral direction from its outboard end to its inboard end. When the body 20 is mounted to the frame 22, the spacer bracket 96 is laterally disposed between the rocker 56 and the outboard side of the left hand frame rail 24.

Spacer bracket 96 and coupling bracket 92 are mounted to the right side of the frame in a mirror image to the mounting on the left side of the frame.

Figure 8:
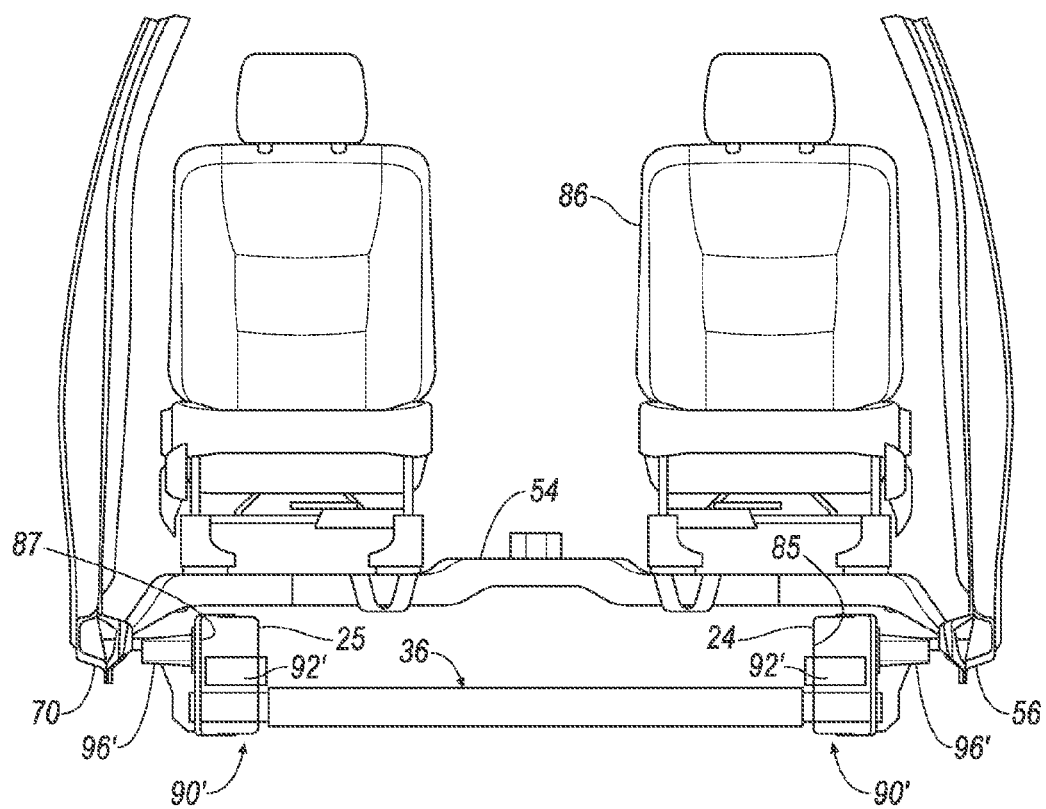
FIG. 8 is a sectional view of the body and frame of FIG. 1 in the same direction as FIG. 2 with both front seats and incorporating a second embodiment of the load path control mechanism.
Figure 9:
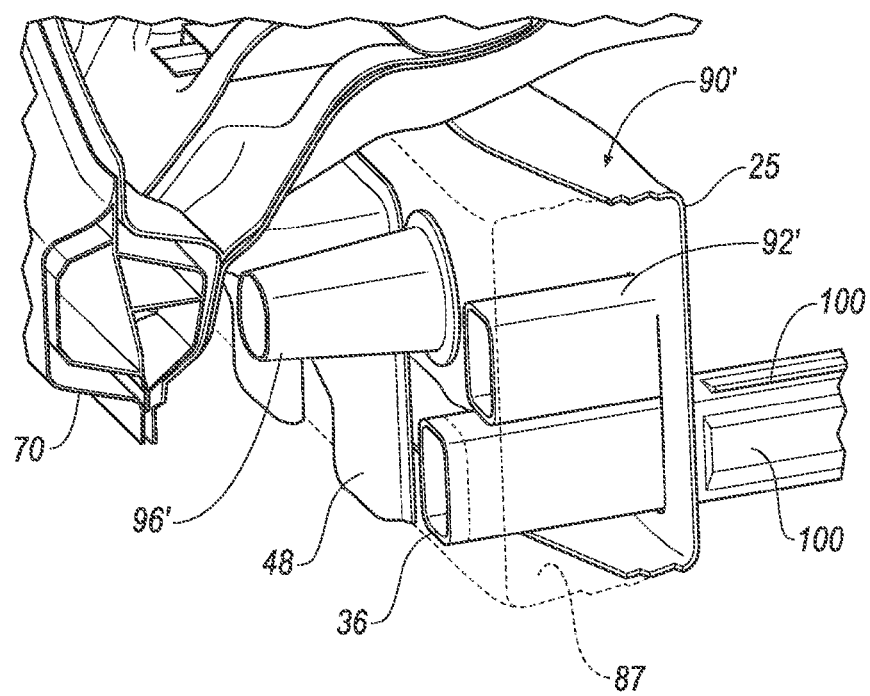
FIG. 9 is an enlarged perspective view of the embodiment of the load path control mechanism of FIG. 8 on the right side, facing inboard and backwards.
Figure 10:
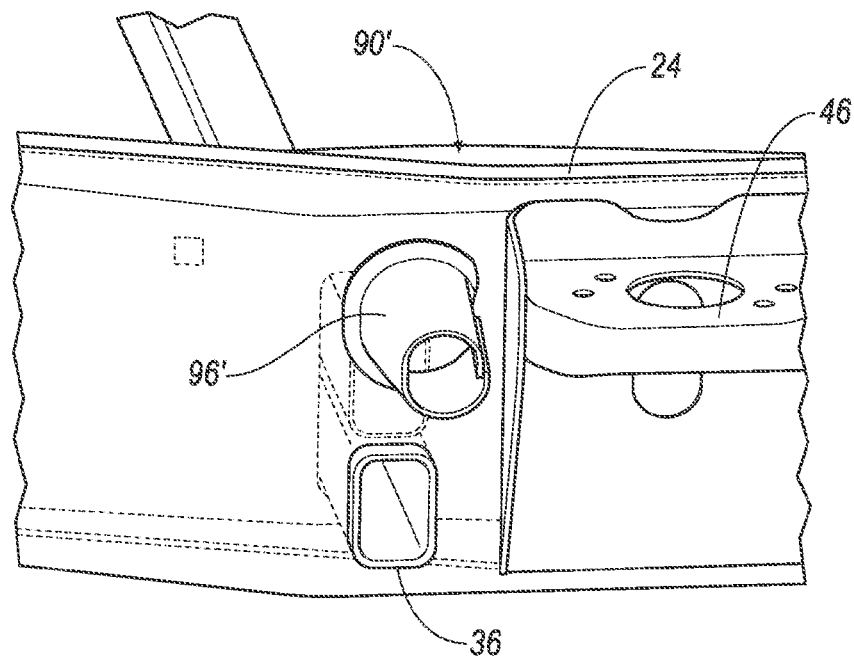
FIG. 10 is an enlarged perspective view of the embodiment of the load path control mechanism of FIG. 8 as disposed on left side of the frame, facing inboard and slightly rearward.

FIGS. 8, 9 and 10 show a second embodiment of the load path mechanism 90'. A coupling bracket 92' is disposed in an inner chamber 87 of the right hand frame rail 25 immediately above and parallel to the crossmember 36. A spacer bracket 96' having a frustoconical shape is fixed directly to the outboard sides of the frame rails 24 and 25 by welding or other appropriate means including but not limited to bolting or riveting. The spacer bracket 96' increases in diameter towards its flanged base 95' base. The tapered shape provides spacer bracket 96' with a stiffness that increases in the lateral direction from its outboard end to its inboard end. The flanged base 95' provides an enhanced engagement surface for engagement of spacer brackets 96' to frame rails 24 and 25. The coupling bracket 92' and the spacer bracket 96' are respectively positioned so that there is overlap of respective areas thereof as defined by sections by planes normal to the lateral axis, especially the sections closest to the outboard side of the associated frame rail, are projected laterally on a plane normal to the lateral axis. Put another way, if coupling bracket 92' could move laterally through the outboard side of rail 24, it would overlap and likely contact spacer bracket 96'. While not necessarily coaxial, the brackets 92' and 96' are aligned with each other to provide such overlap. When the body 20 is mounted to the frame 22, the spacer bracket 96' is laterally disposed between the rocker 70 and the outboard side of the right hand frame rail 25.

The coupling bracket 92' has an open-ended box shape and is shown in more detail in FIG. 15. An inboard portion of the coupling bracket 92' passes from the inner chamber 87 through the inboard side of the frame rail 25 and is fixed d to the inboard side of the frame rail 25 by welding or other appropriate means as suggested elsewhere herein. An inboard end of the coupling bracket 92' is disposed outside of the inboard side of the frame rail 25. The outboard end of the coupling bracket 92' is disposed inside the inner chamber 87. In the illustrated embodiment, there is a small gap between the outboard end of the coupling bracket 92 and the outboard side of the frame rail 24. In the illustrated embodiment, as with the first embodiment, the small gap has a target value of 19 mm, with the target value depending on the associated structural elements such as a thickness of the outboard side of frame rail 24. An alternative design of the coupling bracket 92" shown in FIG. 16 is much the same as the coupling bracket 92', except that the coupling bracket 92" includes teeth 99" shown on the outboard end of the bracket 92". In an alternative embodiment employing the coupling bracket 92", it may be desirable to have the tips of the teeth 99" to provide more robust contact. The coupling bracket 92' may be substituted for the coupling bracket 92 and vice versa.

Figure 12:
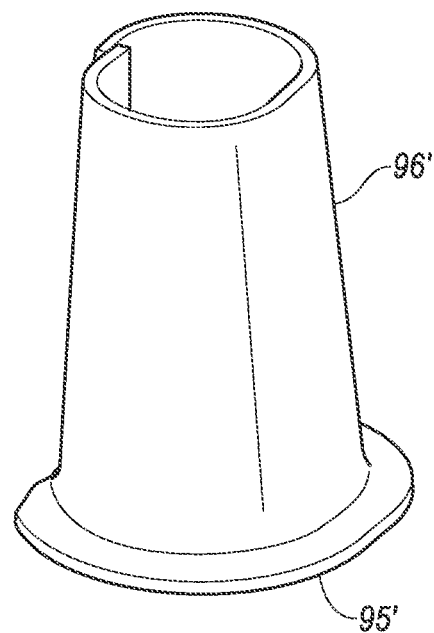
FIG. 12 is a perspective view of the example spacer bracket illustrated in FIGS. 8, 9 and 10.
Figure 13:
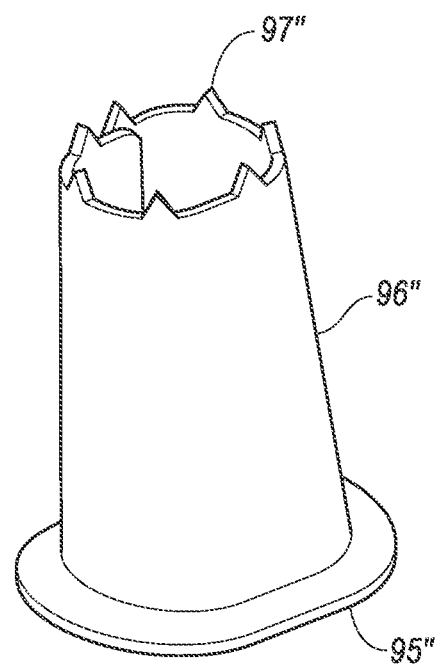
FIG. 13 is a perspective view of an alternative embodiment of the spacer bracket of FIG. 12.

The larger end of the spacer bracket 96' has a flanged base 95' to facilitate being fixed to the frame rails 24 and 25 by welding or other appropriate means as noted herein. The spacer bracket 96' is shown in more detail in FIG. 12. An alternative design of the spacer bracket 96" shown in FIG. 13 has teeth 97" on an end opposite a flanged base 95". The spacer brackets 96, 96' 96" described herein are interchangeable (packaging constraints such as body mount locations permitting) with each other. Similarly the coupling brackets 92. 92', 92" described herein are interchangeable. For example, the spacer 96' may be substituted for the spacer bracket 96 for use with the coupling bracket 92. Similarly, the spacer bracket 96 may be substituted for use with the coupling bracket 92'.

The spacer bracket 96' and the coupling bracket 92' are mounted to the left side of the frame in a mirror image to the mounting on the right side of the frame.

Figure 17:
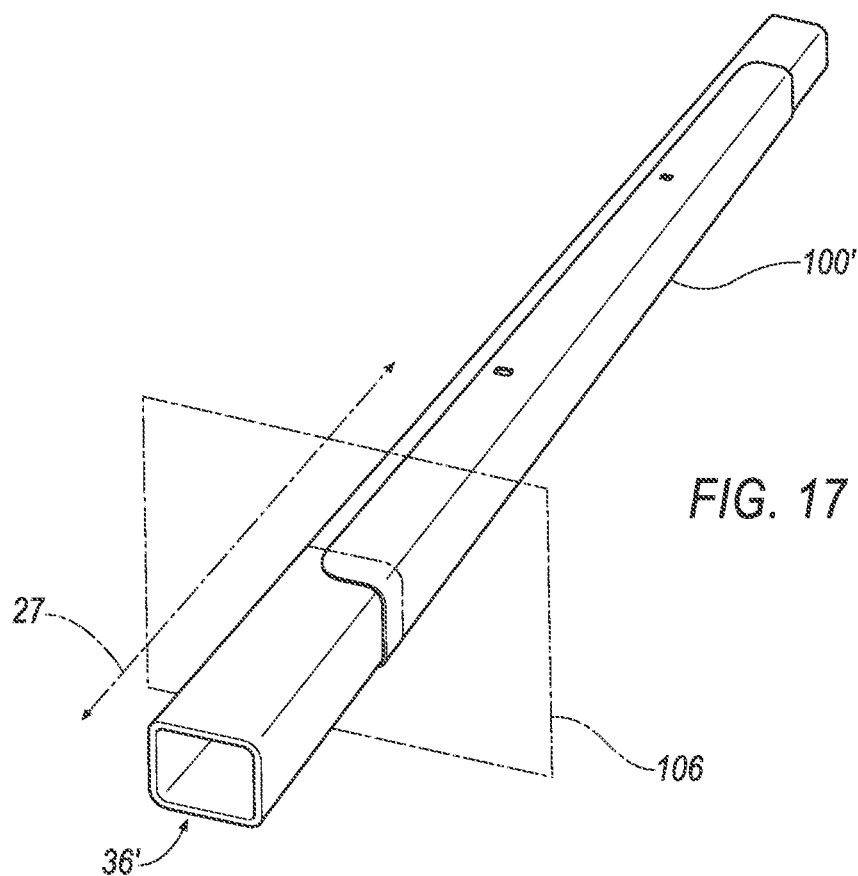
FIG. 17 is a perspective view of a crossmember incorporating an alternative embodiment of a reinforcement.
Figure 18:
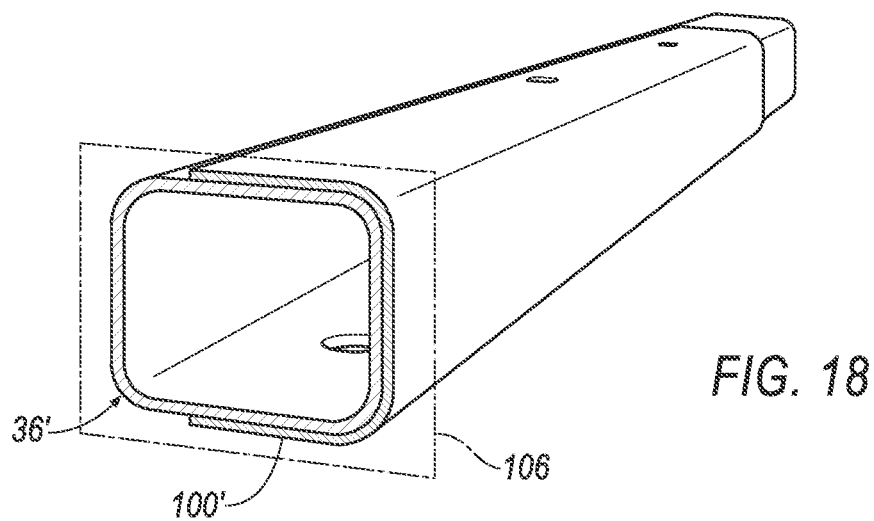
FIG. 18 is a sectioned perspective view of the crossmember illustrated in FIG. 17.

A crossmember reinforcement 100, in one embodiment, provides crossmember 36 with additional bending stiffness. The reinforcement 100 extends between but is spaced from the inboard sides of frame rails 24 and 25. Crossmember 36 can be alternatively selectively reinforced by other means including but not limited to providing varying sectional thicknesses and varying bending moments and varying bending stiffnesses by alternate means including hydroforming and other methods. A first embodiment of crossmember 36 comprises a base rectangular tube with four plate-shaped crossmember reinforcements 100 welded to the tube, one to each side. This embodiment is most clearly illustrated in FIG. 9. An alternative embodiment crossmember 36' is illustrated in FIGS. 17 and 18. A reinforcement 100' in the shape of a C-shaped channel, sized for a line-to-line, or a near line-to-line fit on a base portion of crossmember 36', is fixed by welding, riveting, bolts, adhesives or any of the other means of attachment described herein.

The size of the spacings or gaps between the spacer brackets 96 and 96' and 96" and the rockers 56 and 70 the frame rails 24 and 25 and gaps between the reinforcement 100 and the frame rails 24 and 25 are subject to an optimal deformation pattern selected to control and minimize displacement of the seat 86 responsive to a lateral impact. While it is desirable to keep the spacings between the rockers and the frame rails to as small a value as possible, acceptable targets for such spacing range from 3 mm to 30 mm. Improved means of locating and mounting bodies and frames would of course reduce such range on its low end. A spacing of approximately 3 mm to 30 mm is one possible exemplary range of such spacings. The precise means of attaching the brackets to the frame, whether by a continuous bead of weld, spot welding, stitch welding or rivets or threaded fasteners or adhesives or a combination of any of the preceding, is subject to the same analysis factors and are not key to the present description of the load path control mechanism. Such parameters are selectively chosen to provide controlled deformation responsive to a lateral impact load.

FIGS. 19 and 20 illustrate the performance improvement achieved by the disclosed load path control mechanism. FIG. 19 shows a section of a deformed body and frame not incorporating the disclosed load path control mechanism. FIG. 20 shows a section of a deformed body and frame incorporating the disclosed load path control mechanism.

There are several areas where there are significant differences in deflection. The most significant distinction is in the position of the seat 86 in FIG. 20 relative to the position of the seat 86 in FIG. 19. In FIG. 19, the seat is leaning into the left hand side of the body. In FIG. 20, the seat remains upright relative to the left hand side of the body, which is characterized as a more favorable post-impact seat position than that of FIG. 19. This is attributable to the differences in the combined deflection of the frame 22, particularly including the frame crossmember 36, and the body 20, particularly including floor crossmember 54. The frame of FIG. 19, without the load path control mechanism, exhibits more relative deflection of the left hand rail relative to the frame crossmember 36. Frame crossmember 36 shows very little deflection in the arrangement of FIG. 19, with deflection being forced into the proximate floor crossmember 54. As a result, a lower seat frame bar 102 of a seat back 104 is tipped to angle of 11 degrees relative to a baseline. When frame 22 is supplemented with the load path control mechanism 90, the deflection of the rail relative to frame crossmember 36 is much reduced, with bending being forced into the frame crossmember 36 proximate to the rail 24. Spacer bracket 96 communicates force from the rocker 56 to the frame rail 24. The spacer bracket 96 has a deformation mode whereby the spacer bracket deforms at a first load and at that same load the outboard side of the frame rail 24 deflects against the coupling bracket 92. Deflection of the outboard side of the frame rail causes force to be transferred from spacer bracket 96 to coupling bracket and to crossmember 36 and across to frame rail 25. The lateral loading is shared by crossmember 36 and floor crossmember 54. The gap between the reinforcement 100 and the inboard side of rail 24 contributes to crossmember 36 bending proximate to rail 24. Also, the tapered shape of the spacer brackets 96, 96', 96", contributes to a crush-management benefit of the disclosed load path control mechanism. The crush-management benefit includes an improved communication of impact force from the rocker 56 impinging against an obstacle (or being impinged upon by an obstacle) such as the test impact pole 23 to the proximate frame rail 24, to the frame crossmember 36 and to the distal frame rail 25. The tapered shapes of the spacer brackets 96, 96', 96" all present a larger cross section area and projected area along the lateral axis in the inboard direction. Additionally, there is much less relative side-to-side deflection of the frame rail due to the presence of the coupling bracket 92 inside the frame rail 24. The improved distribution of deflection between the frame and the body significantly reduces the deflection of the lower seat frame bar 102 of the seat back 104 relative to the baseline, dropping it to just a negative one degree tilt instead of 11 degrees.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

It is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto, along with the full scope of equivalents to which such claims are entitled. Unless otherwise stated or qualified herein, all claim terms are intended to be given their plain and ordinary meanings. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A load path control mechanism enabling a controlled distribution of loads from a vehicle body to a vehicle frame comprising:
   a frame rail substantially parallel to a first axis and defining an axially extending inner chamber therein;
   a frame crossmember substantially parallel to a second axis perpendicular to the first axis and fixed to an inboard side of the frame rail at a seat location on the first axis;
   a coupling bracket disposed in the inner chamber and fixed to the frame rail and aligned in parallel with the frame crossmember and the coupling bracket having a first projected area on a plane normal to the second axis; and
   a spacer bracket disposed on a first side of the frame rail opposite the coupling bracket and having a second projected area on the plane normal to the second axis at least partially overlapping the first projected area and the spacer bracket oriented for engagement by a rocker upon deformation of the rocker in a second axial direction parallel to the second axis and the frame rail having a deformation mode responsive to a first load in the second axial direction against the spacer bracket with the spacer bracket deflected in the second axial direction and the first side of the frame rail deflected against the coupling bracket.

2. The load path control mechanism of claim 1, wherein the spacer bracket has a C-shaped cross section and fixed to a body mount located on an outboard side of the frame rail and to the outboard side of the frame rail.

3. The load path control mechanism of claim 1, wherein the spacer bracket having a frustoconical shape and fixed to the outboard side of the frame rail.

4. The load path control mechanism of claim 1, wherein the coupling bracket having a C-shaped cross section and having an open side disposed toward the frame crossmember and having edges bordering the open side fixed to the frame crossmember.

5. The load path control mechanism of claim 1, wherein the coupling bracket has an open ended box shape.

6. The load path control mechanism of claim 1, wherein the frame crossmember having a first bending stiffness proximate to the frame rail and the frame crossmember having a second bending stiffness at a first location spaced a short distance from the frame rail with the second bending stiffness greater than the first bending stiffness and the second bending stiffness extending along the length of the frame crossmember in a direction away from the frame rail such that deflection of the frame crossmember responsive to a load in a direction parallel to the second axis against the frame is more pronounced at a location proximate to the frame rail than distal to the frame rail.

7. The load path control mechanism of claim 6, wherein the spacer bracket having a C-shaped cross section and fixed to a body mount located on an outboard side of the frame rail and to the outboard side of the frame rail.

8. The load path control mechanism of claim 6, wherein the spacer bracket having a frustoconical shape and fixed to the outboard side of the frame rail.

9. The load path control mechanism of claim 6, wherein the coupling bracket having a C-shaped cross section and having an open side disposed toward the frame crossmember and having edges bordering the open side fixed to the frame crossmember.

10. The load path control mechanism of claim 6, wherein the coupling bracket has an open ended box shape.

11. A load path control mechanism enabling a controlled distribution of loads from a vehicle body to a vehicle frame comprising:
   a frame rail substantially parallel to a first axis and defining an axially extending inner chamber therein;
   a frame crossmember substantially parallel to a second axis perpendicular to the first axis and fixed to an inboard side of the frame rail at a seat location on the first axis;
   a coupling bracket disposed in the inner chamber and fixed to the frame rail and aligned in parallel with the frame crossmember and the coupling bracket having a first projected area on a plane normal to the second axis; and
   a spacer bracket disposed on a first side of the frame rail opposite the coupling bracket and having a second projected area on the plane normal to the second axis at least partially overlapping the first projected area and the spacer bracket oriented for engagement by a rocker upon deformation of the rocker in a second axial direction parallel to the second axis and the frame rail having a deformation mode responsive to a first load in the second axial direction against the spacer bracket with the spacer bracket deflected in the second axial direction and the first side of the frame rail deflected against the coupling bracket; and wherein only one spacer bracket and one coupling bracket are disposed on the frame rail for a seat position.

12. The load path control mechanism of claim 11, wherein the spacer bracket having a C-shaped cross section and fixed to a body mount located on an outboard side of the frame rail and to the outboard side of the frame rail.

13. The load path control mechanism of claim 11, wherein the spacer bracket having a frustoconical shape and fixed to the outboard side of the frame rail.

14. The load path control mechanism of claim 11, wherein the coupling bracket having a C-shaped cross section and having an open side disposed toward the frame crossmember and having edges bordering the open side fixed to the frame crossmember.

15. The load path control mechanism of claim 11, wherein the coupling bracket has an open ended box shape.

16. A load path control mechanism enabling a controlled distribution of loads from a vehicle body to a vehicle frame comprising:

a first frame rail substantially parallel to a first axis and defining an axially extending first inner chamber therein;

a second frame rail substantially parallel to the first axis and defining an axially extending second inner chamber therein;

a frame crossmember substantially parallel to a second axis perpendicular to the first axis and disposed between and connecting the frame rails and located at a seat location on the first axis;

a first coupling bracket disposed in the first inner chamber and fixed to the first frame rail and aligned in parallel with the frame crossmember and the first coupling bracket having a first projected coupling area on a plane normal to the second axis;

a second coupling bracket disposed in the second inner chamber and fixed to the second frame rail and aligned in parallel with the frame crossmember and the second coupling bracket having a second projected coupling area on a plane normal to the second axis;

a first spacer bracket disposed on a first side of the first frame rail opposite the first coupling bracket and having a first projected spacer area on the plane normal to the second axis at least partially overlapping the first projected coupling area and the first spacer bracket oriented for engagement by a first rocker upon deformation of the first rocker in a second axial direction parallel to the second axis and the first frame rail having a deformation mode responsive to a first load in the second axial direction against the first spacer bracket with the first spacer bracket deflected in the second axial direction and the first side of the first frame rail deflected against the first coupling bracket;

a second spacer bracket disposed on a first side of the second frame rail opposite the second coupling bracket and having a second projected spacer area on the plane normal to the second axis at least partially overlapping the second projected coupling area and the second spacer bracket oriented for engagement by a second rocker upon deformation of the second rocker in a second axial direction parallel to the second axis and the second frame rail having a deformation mode responsive to a second load in the second axial direction against the second spacer bracket with the second spacer bracket deflected in the second axial direction and the first side of the second frame rail deflected against the second coupling bracket; and the frame crossmember having a first bending stiffness proximate to the first frame rail and the frame crossmember having a second bending stiffness at a first location spaced a short distance from the first frame rail with the second bending stiffness greater than the first bending stiffness and the second bending stiffness extending along the length of the frame crossmember in a direction away from the first frame rail such that deflection of the frame crossmember responsive to a load in a direction parallel to the second axis against the spacer bracket is more pronounced at a location proximate to the first frame rail than distal to the first frame rail wherein only one spacer bracket and one coupling bracket are disposed on each frame rail for a seat position.

17. The load path control mechanism of claim 16, wherein the spacer brackets having a C-shaped cross section and fixed to a body mount located on an outboard side of the frame rail and to the outboard side of the frame rail.

18. The load path control mechanism of claim 16, wherein the spacer brackets having a frustoconical shape and fixed to the outboard side of the frame rail.

19. The load path control mechanism of claim 16, wherein the coupling brackets having a C-shaped cross section and having an open side disposed toward the frame crossmember and having edges bordering the open side fixed to the frame crossmember.

20. The load path control mechanism of claim 16, wherein the coupling bracket has an open ended box shape.

* * * * *